US012125627B2

(12) United States Patent
Kato et al.

(10) Patent No.: US 12,125,627 B2
(45) Date of Patent: Oct. 22, 2024

(54) MULTILAYER INDUCTOR COMPONENT

(71) Applicant: TDK CORPORATION, Tokyo (JP)

(72) Inventors: Daiki Kato, Tokyo (JP); Masashi Shimoyasu, Tokyo (JP); Yoji Tozawa, Tokyo (JP); Seiichi Nakagawa, Tokyo (JP); Akihiko Oide, Tokyo (JP); Makoto Yoshino, Tokyo (JP); Kazuhiro Ebina, Tokyo (JP)

(73) Assignee: TDK CORPORATION, Tokyo (JP)

( * ) Notice: Subject to any disclaimer, the term of this patent is extended or adjusted under 35 U.S.C. 154(b) by 715 days.

(21) Appl. No.: 17/337,985

(22) Filed: Jun. 3, 2021

(65) Prior Publication Data

US 2021/0383960 A1 Dec. 9, 2021

(30) Foreign Application Priority Data

Jun. 5, 2020 (JP) ................................ 2020-098412

(51) Int. Cl.
*H01F 27/28* (2006.01)
*H01F 27/29* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC .... H01F 27/2804; H01F 27/29; H01F 41/041; H01F 2027/28; H01F 17/0013; H01F 27/292; H01F 17/04; H01F 27/04; H01F 2017/048
USPC .................................. 336/200, 232, 198, 16
See application file for complete search history.

(56) References Cited

U.S. PATENT DOCUMENTS

| | | | |
|---|---|---|---|
| 2003/0169556 A1 | 9/2003 | Yokoyama et al. | |
| 2004/0208987 A1 | 10/2004 | Yokoyama et al. | |
| 2007/0000439 A1 | 1/2007 | Yokoyama et al. | |
| 2011/0287176 A1 | 11/2011 | Saito et al. | |
| 2013/0141836 A1 | 6/2013 | Saito et al. | |
| 2014/0192453 A1 * | 7/2014 | Hong ....................... | H01G 4/12 156/89.18 |
| 2016/0099106 A1 | 4/2016 | Kurokawa et al. | |

(Continued)

FOREIGN PATENT DOCUMENTS

| | | |
|---|---|---|
| CN | 109786106 A | 5/2019 |
| CN | 111048311 A | 4/2020 |

(Continued)

*Primary Examiner* — Shawki S Ismail
*Assistant Examiner* — Kazi S Hossain
(74) *Attorney, Agent, or Firm* — Oliff PLC

(57) ABSTRACT

A multilayer conductor component includes an element body, an internal conductor, and an external electrode. The external electrode includes a sintered metal layer. The sintered metal layer is disposed on an end surface, a pair of side surfaces, a first main surface, and a second main surface of the element body. An electrode length, which is a length in the first direction from an edge of the sintered metal layer to a reference plane including the end surface, at a central portion of the first main surface in the third direction, is shorter than the electrode length at each of the ridge portions. The electrode length at a central portion of each of the pair of side surfaces in the second direction is equal to or less than the electrode length at each of the ridge portions.

19 Claims, 5 Drawing Sheets

(56) References Cited

U.S. PATENT DOCUMENTS

| | | | | |
|---|---|---|---|---|
| 2017/0186549 | A1 | 6/2017 | Kurokawa et al. | |
| 2017/0186550 | A1 | 6/2017 | Kurokawa et al. | |
| 2017/0263382 | A1 | 9/2017 | Kurokawa et al. | |
| 2017/0287644 | A1 | 10/2017 | Kurokawa et al. | |
| 2017/0345553 | A1* | 11/2017 | Shimoyasu | H01F 27/292 |
| 2017/0365413 | A1 | 12/2017 | Kurokawa et al. | |
| 2018/0033540 | A1* | 2/2018 | Lee | H01F 41/041 |
| 2018/0137964 | A1 | 5/2018 | Tozawa et al. | |
| 2018/0374628 | A1 | 12/2018 | Yamauchi et al. | |
| 2019/0148075 | A1* | 5/2019 | Nakamura | H01G 13/006<br>361/301.1 |
| 2020/0118755 | A1 | 4/2020 | Yajima et al. | |
| 2022/0122775 | A1 | 4/2022 | Nakamura et al. | |

FOREIGN PATENT DOCUMENTS

| | | | |
|---|---|---|---|
| JP | H03-229407 | A | 10/1991 |
| JP | 2000-331832 | A | 11/2000 |
| JP | 2003-264117 | A | 9/2003 |
| JP | 2006-310700 | A | 11/2006 |
| JP | 2012-4544 | A | 1/2012 |
| JP | 2015-053495 | A | 3/2015 |
| JP | 2016-115918 | A | 6/2016 |
| JP | 2018-082039 | A | 5/2018 |
| JP | 2018-125455 | A | 8/2018 |
| JP | 2019-009299 | A | 1/2019 |

* cited by examiner

MULTILAYER INDUCTOR COMPONENT

TECHNICAL FIELD

One aspect of the present disclosure relates to a multilayer inductor component.

BACKGROUND

Japanese Unexamined Patent Publication No. 2019-9299 discloses a multilayer inductor including a stack, a coil disposed in the stack, and an external electrode disposed on a surface of the stack and electrically connected to the coil. In this multilayer inductor, an external electrode is disposed over an end surface and four side surfaces of the stack. An edge of the external electrode is continuous over the four side surfaces.

SUMMARY

An object of the present disclosure is to provide a multilayer inductor component capable of suppressing an occurrence of cracks in an element body.

As a result of the research, the present inventors have newly found the following facts.

A multilayer conductor component is mounted on an electronic device such as circuit substrate or other electronic components by soldering an external electrode to the electronic device. In this case, the stress due to thermal shock or the like tends to concentrate on an edge of the sintered metal layer via the solder. This may cause cracks in the element body starting from the edge.

A multilayer conductor component according to the present disclosure includes an element body having a rectangular parallelepiped shape, an internal conductor, and an external electrode. The element body includes a pair of end surfaces opposed to each other in a first direction; a first main surface constituting a mounting surface; a second main surface opposed to the first main surface in a second direction orthogonal to the first direction; and a pair of side surfaces opposed to each other in a third direction orthogonal to the first direction and the second direction. The internal conductor is disposed in the element body. The external electrode includes a sintered metal layer. The sintered metal layer is disposed on the end surface, the pair of side surfaces, the first main surface, and the second main surface. The sintered metal layer is electrically connected to the internal conductor. The element body includes four ridge portions disposed between each of the pair of side surfaces and each of the first main surface and the second main surface. An edge of the sintered metal layer is continuous over the pair of side surfaces, the first main surface, the second main surface, and the ridge portions. An electrode length, which is a length in the first direction from the edge to a reference plane including the end surface, at a central portion of the first main surface in the third direction, is shorter than the electrode length at each of the ridge portions located on both sides of the first main surface in the third direction. The electrode length at a central portion of each of the pair of side surfaces in the second direction is equal to or less than the electrode length at each of the ridge portions located on both sides of each of the pair of side surfaces in the second direction.

In this multilayer conductor component, the edge of the sintered metal layer is continuous over the pair of side surfaces, the first main surface, the second main surface, and the ridge portions of the element body. The electrode length at the central portion of the first main surface in the third direction is shorter than the electrode length at each ridge portion located on both sides of the first main surface in the third direction. Therefore, the stress due to thermal shock or the like can be dispersed from the central portion of the first main surface to the ridge portions located on both sides of the first main surface. The electrode length at the central portion of each of the pair of side surfaces in the second direction is equal to or less than the electrode length at each of the ridge portions located on both sides of each of the pair of side surfaces in the second direction. Therefore, it is possible to suppress the concentration of the stress at the central portion of each of the pair of side surfaces. From the above, the occurrence of cracks in the element body can be suppressed.

The electrode length may monotonically increase from the central portion of the first main surface in the third direction toward the ridge portions located on both sides of the first main surface in the third direction. In this case, the stress can be reliably dispersed from the central portion of the first main surface to the ridge portions located on both sides of the first main surface.

The electrode length at the central portion of each of the pair of side surfaces in the second direction may be shorter than the electrode length at each of the ridge portions located on both sides of each of the pair of side surfaces in the second direction. In this case, the stress can be dispersed from the central portion of each of the pair of side surfaces to each ridge portion located on both sides of each of the pair of side surfaces.

A multilayer conductor component according to the present disclosure includes an element body having a rectangular parallelepiped shape, an internal conductor, and an external electrode. The element body includes a pair of end surfaces opposed to each other in a first direction; a first main surface constituting a mounting surface; a second main surface opposed to the first main surface in a second direction orthogonal to the first direction; and a pair of side surfaces opposed to each other in a third direction orthogonal to the first direction and the second direction. The internal conductor is disposed in the element body. The external electrode includes a sintered metal layer. The sintered metal layer is disposed on the end surface, the pair of side surfaces, the first main surface, and the second main surface. The sintered metal layer is electrically connected to the internal conductor. The element body includes four ridge portions disposed between each of the pair of side surfaces and each of the first main surface and the second main surface. An edge of the sintered metal layer is continuous over the pair of side surfaces, the first main surface, the second main surface, and the ridge portions. An electrode length, which is a length in the first direction from the edge to a reference plane including the end surface, at a central portion of the first main surface in the third direction, is equal to or less than the electrode length at each of the ridge portions located on both sides of the first main surface in the third direction. The electrode length at a central portion of each of the pair of side surfaces in the second direction is shorter than the electrode length at each of the ridge portions located on both sides of each of the pair of side surfaces in the second direction.

In this multilayer conductor component, the edge of the sintered metal layer is continuous over the pair of side surfaces, the first main surface, the second main surface, and the ridge portions of the element body. The electrode length at the central portion of each of the pair of side surfaces in the second direction is shorter than the electrode length at each of the ridge portions located on both sides of each of the pair of side surfaces in the second direction. Therefore, the stress due to thermal shock or the like can be dispersed from the central portion of each of the pair of side surfaces to each of the ridge portions located on both sides of each of the pair of side surfaces. In addition, the electrode length at the central portion of the first main surface in the third direction is equal to or less than the electrode length at each of the ridge portions located on both sides of the first main surface in the third direction. Therefore, it is possible to suppress the concentration of the stress at the central portion of the first main surface. From the above, the occurrence of cracks in the element body can be suppressed.

The electrode length may monotonically increase from the central portion of each of the pair of side surfaces in the second direction toward the ridge portions located on both sides of each of the pair of side surfaces in the second direction. In this case, the stress can be reliably dispersed from the central portion of each of the pair of side surfaces to each ridge portion located on both sides of each of the pair of side surfaces.

Sinterabilities of the ridge portions may be greater than sinterabilities of other portions of the element body. In this case, since the strength of the ridge portion is improved, the occurrence of cracks in the element body is further suppressed.

The element body may include a ferrite sintered body. In this case, since the element body includes a ferrite whose firing temperature is lower than that of dielectric ceramic or the like and whose strength is difficult to improve, it is more important to suppress the occurrence of cracks.

The electrode length may be 5% or more and 15% or less of a length of the element body in the first direction. In this case, the mounting strength of the multilayer conductor component can be increased when the electrode length is 5% or more. The stress applied to the element body can be suppressed when the electrode length is 15% or less.

The electrode length at a central portion of the second main surface in the third direction may shorter than the electrode length at each of the ridge portions located on both sides of the second main surface in the third direction. In this case, the stress can be dispersed from the central portion of the second main surface to the ridge portions located on both sides of the second main surface.

The electrode length may monotonically increase from the central portion of the second main surface in the third direction toward the ridge portions located on both sides of the second main surface in the third direction. In this case, the stress can be reliably dispersed from the second main surface to the ridge portions located on both sides of the second main surface.

DETAILED DESCRIPTION

Figure 1:
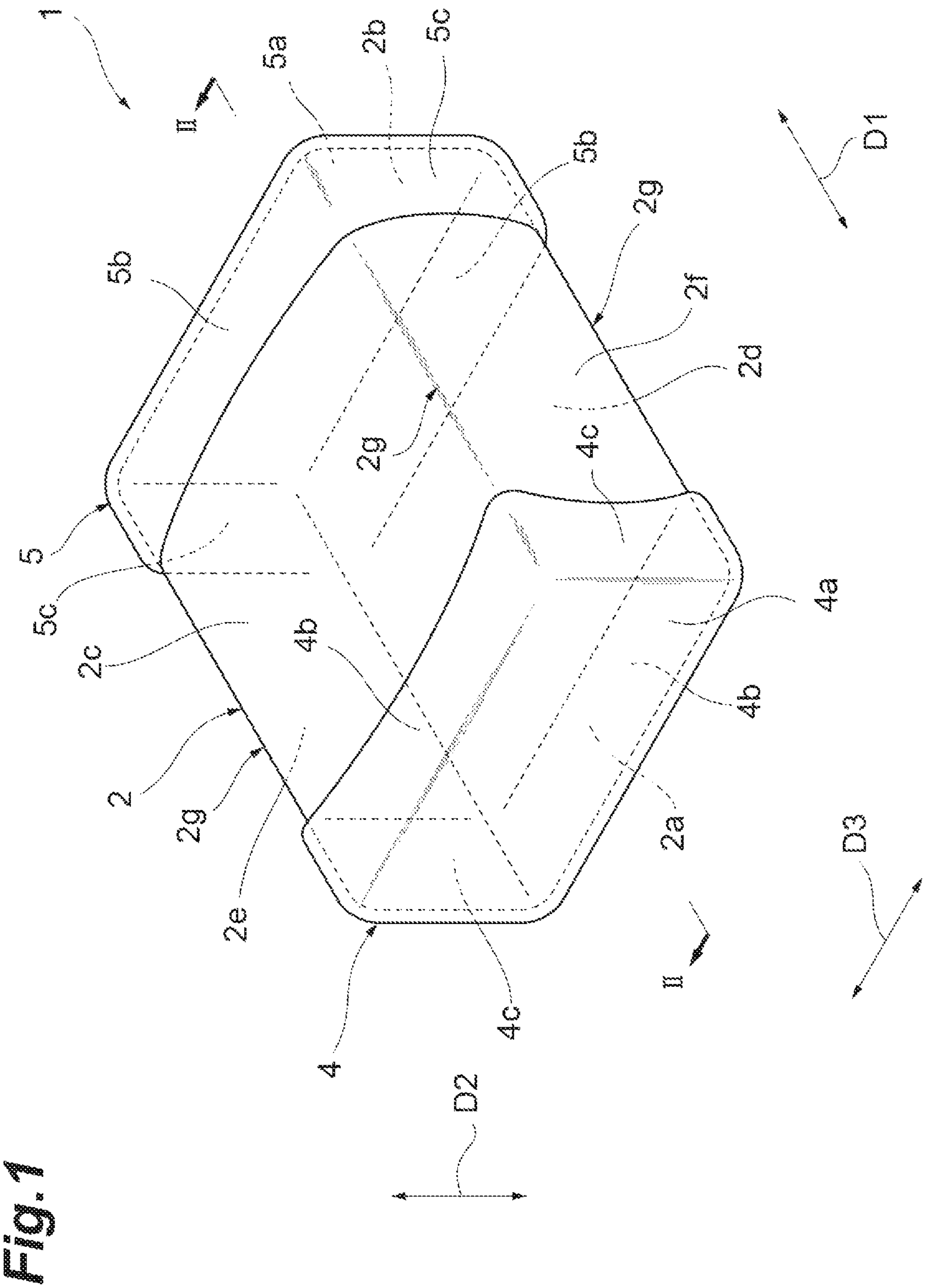
FIG. 1 is a perspective view showing a multilayer conductor component according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
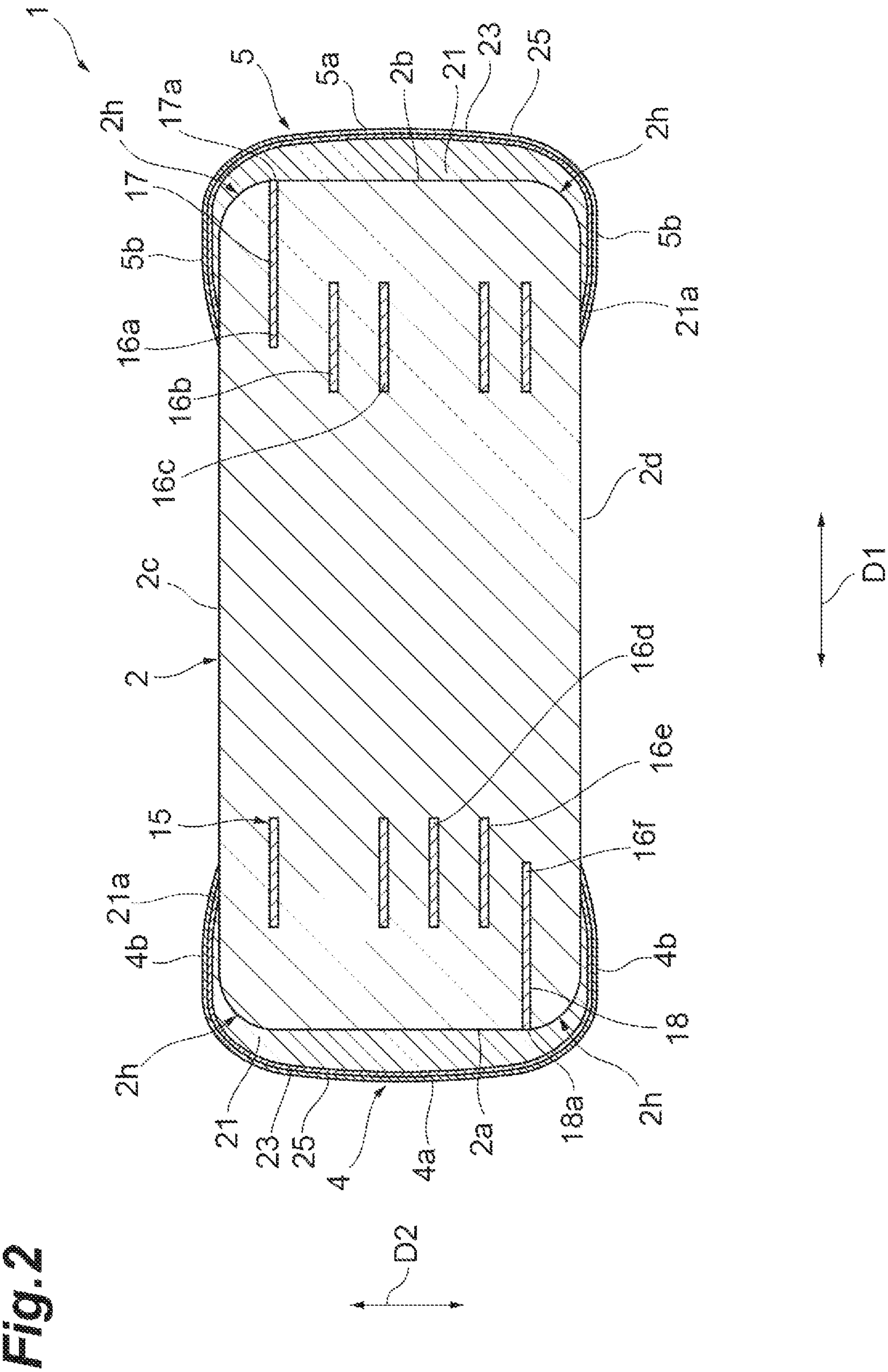
FIG. 2 is a diagram for explaining a cross-sectional configuration of the multilayer conductor component of FIG. 1.

As shown in FIGS. 1 and 2, a multilayer conductor component 1 according to an embodiment includes an element body 2 having a rectangular parallelepiped shape, and a pair of external electrodes 4 and 5 disposed on the surface of the element body 2. The pair of external electrodes 4 and 5 are disposed at both ends of the element body 2 and are spaced from each other. The rectangular parallelepiped shape includes a rectangular parallelepiped shape in which corner portions and ridge portions are chamfered and a rectangular parallelepiped shape in which corner portions and ridge portions are rounded. The multilayer inductor component 1 can be applied to, for example, a bead inductor or a power inductor.

The element body 2 has a rectangular parallelepiped shape. The element body 2 has, as its surface, a pair of end surfaces 2*a* and 2*b*, a pair of main surfaces 2*c* and 2*d*, and a pair of side surfaces 2*e* and 2*f*. The end surfaces 2*a* and 2*b* are opposed to each other. The main surfaces 2*c* and 2*d* are opposed to each other. The side surfaces 2*e* and 2*f* are opposed to each other. Each of the pair of end surfaces 2*a* and 2*b* is adjacent to each of the pair of main surfaces 2*c* and 2*d* and the pair of side surfaces 2*e* and 2*f*. The main surface 2*d* constitutes a mounting surface. The mounting surface is defined as a surface facing other electronic devices when the multilayer conductor component 1 is mounted on the other electronic devices (for example, a circuit substrate or an electronic component), not shown.

In the present embodiment, the direction in which the pair of end surfaces 2*a* and 2*b* opposed to each other (the first direction D1) is the length direction of the element body 2. The direction in which the pair of main surfaces 2*c* and 2*d* opposed to each other (second direction D2) is the height direction of the element body 2. The direction in which the pair of side surfaces 2*e* and 2*f* opposed to each other (third direction D3) is the width direction of the element body 2. The first direction D1, the second direction D2, and the third direction D3 are orthogonal to each other.

A length L1 (see FIGS. 4 and 5) of the element body 2 in the first direction D1 is longer than the length of the element body 2 in the second direction D2 and the length of the element body 2 in the third direction D3. The length of the element body 2 in the second direction D2 is shorter than the length of the element body 2 in the third direction D3. That is, in this embodiment, the pair of end surfaces 2*a* and 2*b*, the pair of main surfaces 2*c* and 2*d*, and the pair of side surfaces 2*e* and 2*f* have rectangular shapes. The length L1 of the element body 2 in the first direction D1 is, for example, 2 mm. The length of the element body 2 in the second direction D2 is, for example, 0.85 mm. The length of the element body 2 in the third direction D3 is, for example, 1.6 mm. The length L1 of the element body 2 in the first direction D1 may be equal to the length of the element body 2 in the second direction D2 and the length of the element body 2 in the third direction D3. The length of the element body 2 in the second direction D2 and the length of the element body 2 in the third direction D3 may be equal to each other.

In addition to equality, values including a slight difference within a preset range, a manufacturing error, or the like may be "equal". For example, when a plurality of values is included in a range of ±5% of an average value of the plurality of values, the plurality of values is defined to be equal.

The end surfaces 2*a* and 2*b* extend in the second direction D2 in such a way to connect the pair of main surfaces 2*c* and 2*d*. That is, the end surfaces 2*a* and 2*b* extend in a direction intersecting the main surfaces 2*c* and 2*d*. The end surfaces 2*a* and 2*b* also extend in the third direction D3. The pair of main surfaces 2*c* and 2*d* extend in the first direction D1 in such a way to connect the pair of end surfaces 2*a* and 2*b*. The pair of main surfaces 2*c* and 2*d* also extend in the third direction D3. The pair of side surfaces 2*e* and 2*f* extend in the second direction D2 in such a way to connect the pair of main surfaces 2*c* and 2*d*. The pair of side surfaces 2*e* and 2*f* also extend in the first direction D1.

The element body 2 includes four ridge portions 2*g* extending along the first direction D1 and eight ridge portions 2*h* extending along the outer edges of the pair of end surfaces 2*a* and 2*b*. Each ridge portion 2*g* is located between each of the pair of main surfaces 2*c* and 2*d* and each of the pair of side surfaces 2*e* and 2*f* adjacent to each other. That is, four ridge portions 2*g* are located between the main surface 2*c* and the side surface 2*e*, between the side surface 2*e* and the main surface 2*d*, between the main surface 2*d* and the side surface 2*f*, and between the side surface 2*f* and the main surface 2*c*.

The eight ridge portions 2*h* are located between each of the pair of end surfaces 2*a* and 2*b* and each of the pair of main surfaces 2*c* and 2*d* and the pair of side surfaces 2*e* and 2*f* adjacent to each other. That is, eight ridge portions 2*h* are located between the end surface 2*a* and the main surface 2*c*, between the end surface 2*a* and the main surface 2*d*, between the end surface 2*a* and the side surface 2*e*, between the end surface 2*a* and the side surface 2*f*, between the end surface 2*b* and the main surface 2*c*, between the end surface 2*b* and the main surface 2*d*, and between the end surface 2*b* and the side surface 2*e*, and between the end surface 2*b* and the side surface 2*f*.

The ridge portions 2*g* and 2*h* are rounded in such a way that their surfaces are curved. The radii of curvature of the ridge portions 2*g* and 2*h* are, for example, 10% or more and 15% or less of the length of the element body 2 in the second direction D2. The radii of curvature of the ridge portions 2*g* and 2*h* are, for example, 90 μm. The radii of curvature of the ridge portions 2*g* and 2*h* may be different from each other.

Sinterabilities of the ridge portions 2*g* and 2*h* are greater than sinterabilities of portions of the element body 2 other than the ridge portions 2*g* and 2*h*. The sinterabilities can be determined, for example, on the basis of a cross-sectional photograph of the element body 2. The sinterabilities of the ridge portions 2*g* and 2*h* can be enhanced, for example, by performing barrel polishing on the green chips before firing when the element body 2 is manufactured. According to barrel polishing, since the media is more likely to collide with the ridge portion than the flat portion of the green chip, the ridge portion can be rounded in such a way that its surface is curved, the holes in the ridge portion can be reduced, and the density of the ridge portion can be increased compared to other portions of the green chip. As a result, the sinterabilities of the ridge portions 2*g* and 2*h* after firing can be improved.

Figure 3:
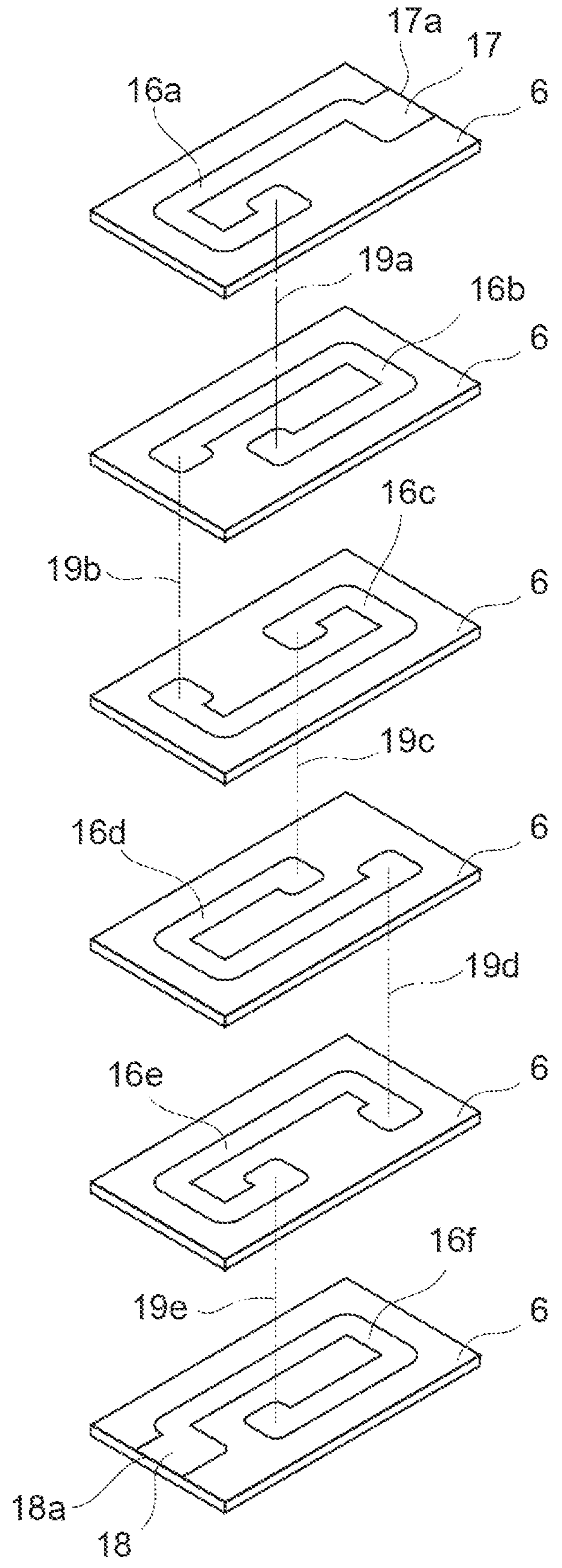
FIG. 3 is an exploded perspective view showing the configuration of the internal conductor.

As shown in FIG. 3, the element body 2 is formed by stacking a plurality of insulator layers 6. The element body 2 includes a plurality of laminated insulator layers 6. The plurality of insulator layers 6 are stacked in a direction in which the main surface 2*c* and the main surface 2*d* (See FIGS. 1 and 2) are opposed to each other. That is, the stacking direction of the plurality of insulator layers 6 coincides with the direction in which the main surface 2*c* and the main surface 2*d* are opposed to each other. Hereinafter, the direction in which the main surface 2*c* and the main surface 2*d* are opposed to each other is also referred to as a "stacking direction". Each insulator layer 6 has a substantially rectangular shape. In the actual element body 2, the insulator layers 6 are integrated in such a way that boundaries between the layers 6 cannot be visually recognized.

Each insulator layer 6 is formed of a sintered body of a ceramic green sheet containing a ferrite material (for example, a Ni—Cu—Zn-based ferrite material, a Ni—Cu—Zn—Mg-based ferrite material, or a Ni—Cu-based ferrite material). That is, the element body 2 is made of a ferrite sintered body.

As shown in FIGS. 2 and 3, the multilayer inductor component 1 further includes, as internal conductors disposed inside the element body 2, a plurality of coil conductors 16*a*, 16*b*, 16*c*, 16*d*, 16*e*, and 16*f*, a pair of connection conductors 17, 18 and, and a plurality of through-hole conductors 19*a*, 19*b*, 19*c*, 19*d*, and 19*e*. The coil conductors 16*a* to 16*f* constitute the coil 15 inside the element body 2. The coil conductors 16*a* to 16*f* include a conductive material (for example, Ag or Pd). The coil conductors 16*a* to 16*f* are formed as sintered bodies of a conductive paste containing a conductive material (for example, Ag powder or Pd powder).

The connection conductor 17 is connected to the coil conductor 16*a*. The connection conductor 17 is disposed on the end surface 2*b* side of the element body 2. The connection conductor 17 has an end portion 17*a* exposed on the end surface 2*b*. The end portion 17*a* is exposed at a position closer to the main surface 2*c* than the central portion of the end surface 2*b* when viewed from the direction orthogonal to the end surface 2*b*. The end portion 17*a* is connected to the external electrode 5. That is, the coil conductor 16*a* is electrically connected to the external electrode 5 through the connection conductor 17. In the present embodiment, the conductor pattern of the coil conductor 16*a* and the conductor pattern of the connection conductor 17 are formed integrally and continuously.

The connection conductor 18 is connected to the coil conductor 16*f*. The connection conductor 18 is disposed on the end surface 2*a* side of the element body 2. The connection conductor 18 has an end portion 18*a* exposed on the end surface 2*a*. The end portion 18*a* is exposed at a position closer to the main surface 2*d* than the central portion of the end surface 2*a* when viewed from the direction orthogonal to the end surface 2*a*. The end portion 18*a* is connected to the external electrode 4. That is, the coil conductor 16*f* is electrically connected to the external electrode 4 through the connection conductor 18. In the present embodiment, the conductor pattern of the coil conductor 16*f* and the conductor pattern of the connection conductor 18 are formed integrally and continuously.

The coil conductors 16*a* to 16*f* are arranged side by side in the lamination direction of the insulator layers 6 in the element body 2. The coil conductors 16*a* to 16*f* are arranged in the order of the coil conductor 16*a*, the coil conductor 16*b*, the coil conductor 16*c*, the coil conductor 16*d*, the coil conductor 16*e*, and the coil conductor 16*f* from the side closer to the main surface 2*c*.

The through-hole conductors 19*a* to 19*e* connect ends of the coil conductors 16*a* to 16*f* to each other. The coil conductors 16*a* to 16*f* are electrically connected to each other by through-hole conductors 19*a* to 19*e*. The coil 15 is configured by electrically connecting a plurality of coil conductors 16*a* to 16*f*. Each of the through-hole conductors 19*a* to 19*e* contains a conductive material (for example, Ag or Pd). Like the coil conductors 16*a* to 16*f*, each of the through-hole conductors 19*a* to 19*e* is configured as a sintered body of a conductive paste containing a conductive material (for example, Ag powder or Pd powder).

The through-hole conductors 19*a* to 19*e* are arranged side by side in the stacking direction of the insulator layers 6 in the element body 2. The plurality of through-hole conductors 19*a* to 19*e* are arranged in the order of the through-hole conductor 19*a*, the through-hole conductor 19*b*, the through-hole conductor 19*c*, the through-hole conductor 19*d*, and the through-hole conductor 19*e* from the side closer to the main surface 2*c*.

As shown in FIGS. 1 and 2, the external electrode 4 is located at an end portion on the end surface 2*a* side of the element body 2 when viewed from the first direction D1. The external electrode 4 includes an electrode portion 4*a* located on the end surface 2*a*, electrode portions 4*b* located on the main surfaces 2*c* and 2*d*, and electrode portions 4*c* located on the side surfaces 2*e* and 2*f*. That is, the external electrode 4 is formed on the five surfaces 2*a*, 2*c*, 2*d*, 2*e*, and 2*f*. The external electrode 4 is disposed over the end surface 2*a*, the main surfaces 2*c* and 2*d*, and the side surfaces 2*e*, and 2*f*.

The electrode portions 4*a*, 4*b*, and 4*c* adjacent to each other are connected and electrically connected to each other at the ridge portions 2*g* and 2*h* of the element body 2. The electrode portion 4*a* and each of the electrode portions 4*b* are connected at the ridge portion 2*h* between the end surface 2*a* and each of the main surfaces 2*c* and 2*d*. The electrode portion 4*a* and each of the electrode portions 4*c* are connected at the ridge portion 2*h* between the end surface 2*a* and each of the side surfaces 2*e* and 2*f*. Each of the electrode portion 4*b* and each of the electrode portion 4*c* are connected at the ridge portion 2*g* between each of the main surfaces 2*c* and 2*d* and each of the side surfaces 2*e* and 2*f*.

The electrode portion 4*a* is disposed in such a way to entirely cover the end portion 18*a* of the connection conductor 18 exposed at the end surface 2*a*, and the connection conductor 18 is directly connected to the external electrode 4. That is, the connection conductor 18 connects the coil conductor 16*a* (one end of the coil 15) and the electrode portion 4*a*. Thus, the coil 15 is electrically connected to the external electrode 4.

The external electrode 5 is located at an end portion on the end surface 2*b* side of the element body 2 when viewed from the first direction D1. The external electrode 5 includes an electrode portion 5*a* located on the end surface 2*b*, an electrode portions 5*b* located on the main surfaces 2*c* and 2*d*, and an electrode portions 5*c* located on the side surfaces 2*e* and 2*f*. That is, the external electrodes 5 are formed on the five surfaces 2*b*, 2*c*, 2*d*, 2*e*, and 2*f*. The external electrode 5 is disposed over the end surface 2*b*, the main surfaces 2*c* and 2*d*, and the side surfaces 2*e* and 2*f*.

The electrode portions 5*a*, 5*b*, and 5*c* adjacent to each other are connected and electrically connected to each other at the ridge portions 2*g* and 2*h* of the element body 2. The electrode portion 5*a* and each of the electrode portions 5*b* are connected at the ridge portion 2*h* between the end surface 2*b* and each of the main surfaces 2*c* and 2*d*. The electrode portion 5*a* and each of the electrode portions 5*c* are connected at the ridge portion 2*h* between the end surface 2*b* and each of the side surfaces 2*e* and 2*f*. Each of the electrode portion 5*b* and each of the electrode portion 5*c* are connected at the ridge portion 2*g* between each of the main surfaces 2*c* and 2*d* and each of the side surfaces 2*e* and 2*f*.

The electrode portion 5*a* is disposed in such a way to entirely cover the end portion 17*a* of the connection conductor 17 exposed at the end surface 2*b*, and the connection conductor 17 is directly connected to the external electrode 5. That is, the connection conductor 17 connects the coil conductor 16*f* (the other end of the coil 15) and the electrode portion 5*a*. Thus, the coil 15 is electrically connected to the external electrode 5.

Each of the external electrodes 4 and 5 includes a sintered metal layer 21, a first plating layer 23, and a second plating layer 25. That is, the electrode portions 4*a*, 4*b*, and 4*c* and the electrode portions 5*a*, 5*b*, and 5*c* include the sintered metal layer 21, the first plating layer 23, and the second plating layer 25, respectively. The second plating layer 25 constitutes the outermost layer of the external electrode 4 and 5. None of the external electrode 4 and 5 includes a resin electrode layer containing resin.

The sintered metal layer 21 is disposed on the surface of the element body 2. The sintered metal layer 21 of the external electrode 4 is disposed over the pair of main surfaces 2*c* and 2*d*, the pair of side surfaces 2*e* and 2*f*, and the end surface 2*a*. The sintered metal layer 21 of the external electrode 5 is disposed over the pair of main surfaces 2*c* and 2*d*, the pair of side surfaces 2*e* and 2*f*, and the end surface 2*b*.

The sintered metal layer 21 is formed by applying a conductive paste to the surface of the element body 2 and baking it. The conductive paste is applied to the surface of the element body 2 by, for example, a dipping method. As the conductive paste, for example, a mixture of a conductor component, a glass component, an organic binder, and an organic solvent is used. The conductor component is, for example, a metal powder such as Ag or Cu. In the present embodiment, the conductor component is Ag powder.

In the sintered metal layer 21, the thickness of the portion disposed on the end surfaces 2*a* and 2*b* (the sintered metal layer 21 included in the electrode portions 4*a* and 5*a*) decreases toward the ridge portions 2*h* and increases toward the central portions of the end surfaces 2*a* and 2*b*. The maximum thickness of the electrode portions 4*a* and 5*a* is, for example, 40 μm or more and 50 μm or more. The maximum thickness of the electrode portions 4*b* and 5*b* is, for example, 20 μm. The maximum thickness of the electrode portions 4*c* and 5*c* is, for example, 20 μm. The thicknesses of the electrode portions 4*a*, 4*b* and 4*c* can be controlled by, for example, the thickness of the conductive paste applied to the element body 2.

Figure 4:
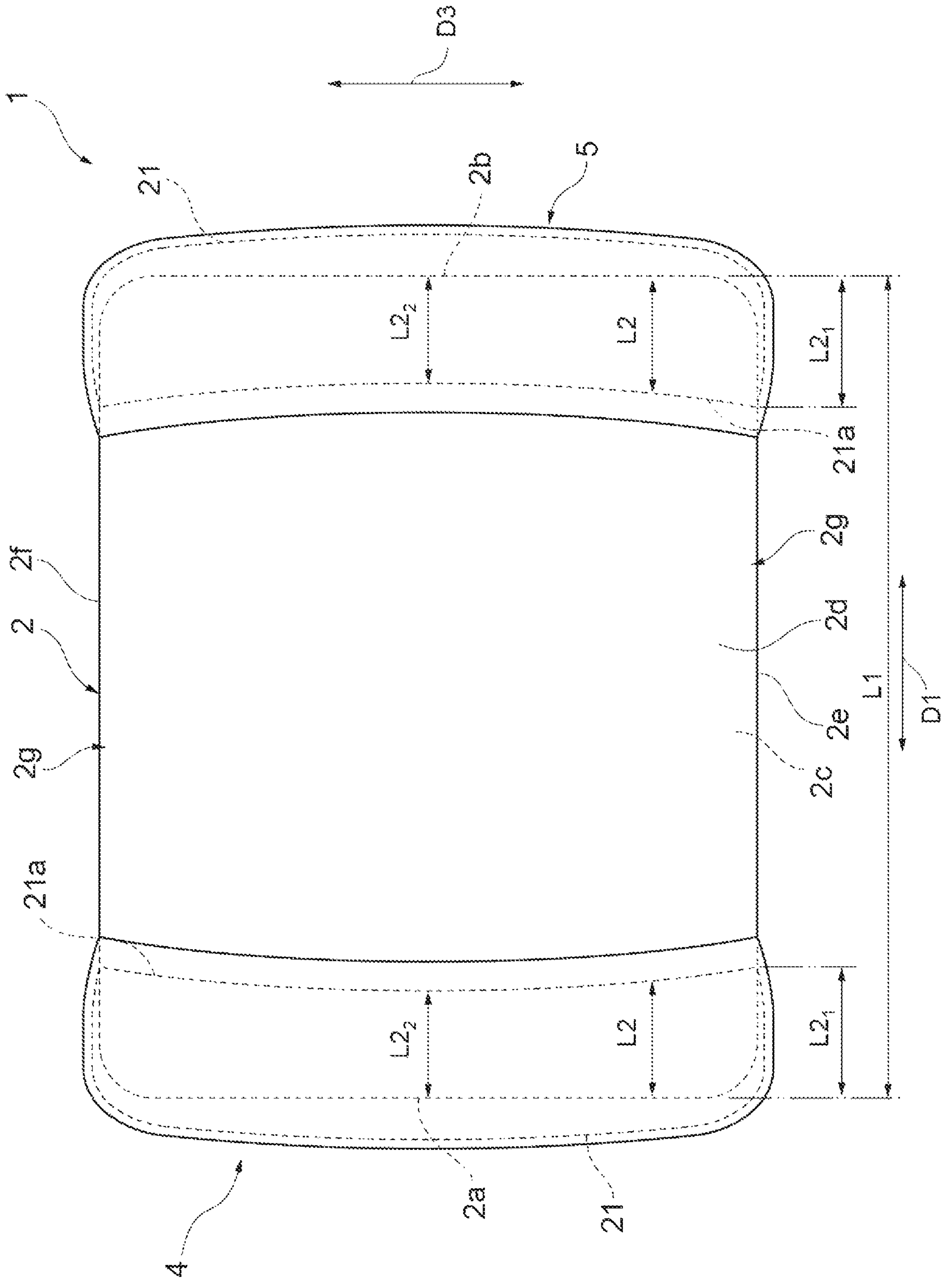
FIG. 4 is a bottom view showing the multilayer conductor component of FIG. 1.
Figure 5:
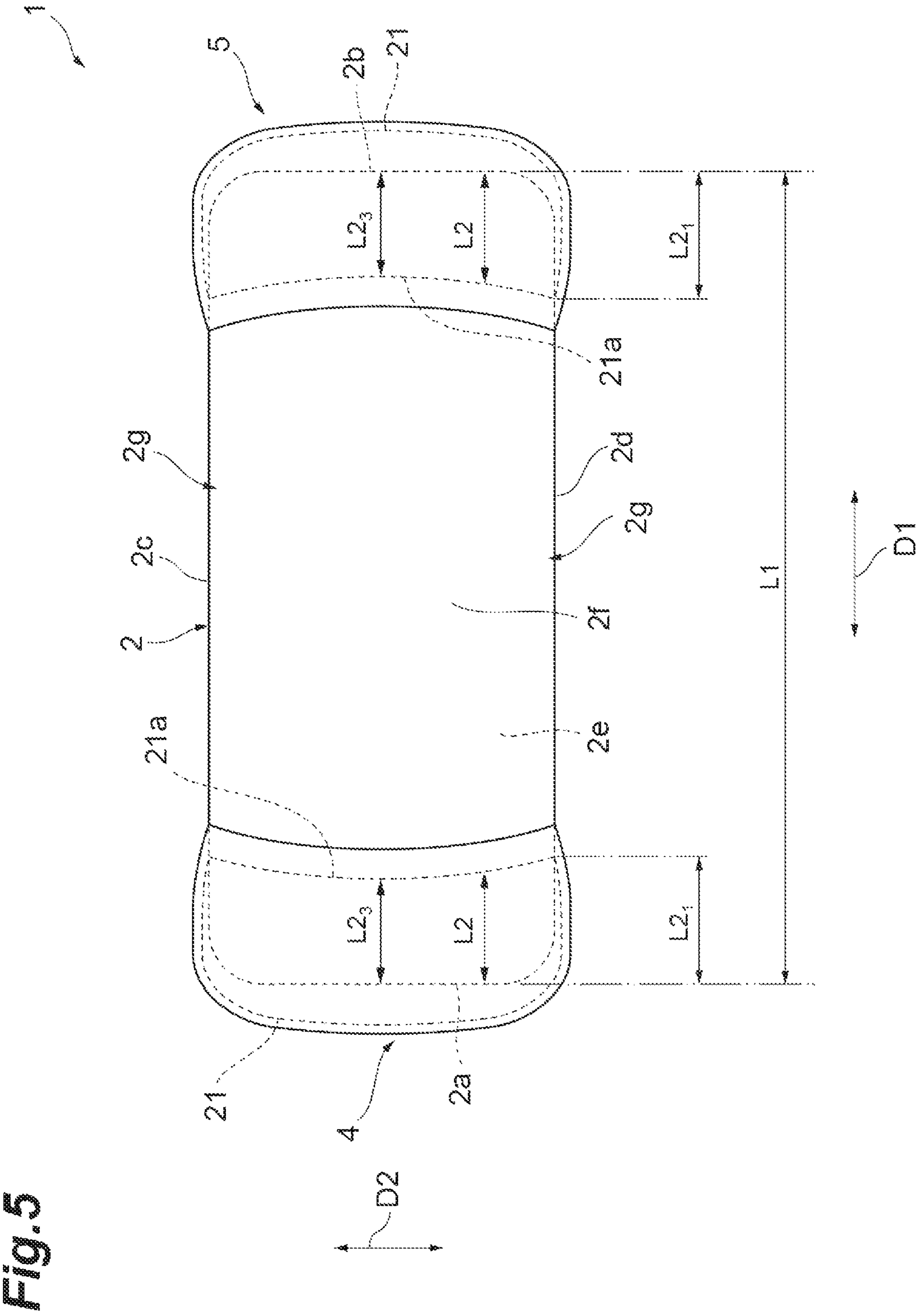
FIG. 5 is a side surface view showing the multilayer conductor component of FIG. 1.

FIG. 4 shows a plan view of the multilayer conductor component 1 as viewed from the main surface 2*d* side. A plan view of the multilayer conductor component 1 as viewed from the main surface 2*c* side is omitted since it is equivalent to the plan view of the multilayer conductor component 1 as viewed from the main surface 2*d* side shown in FIG. 4. FIG. 5 shows a plan view of the multilayer conductor component 1 as viewed from the side surface 2*f* side. The plan view of the multilayer conductor component 1 as viewed from the side surface 2*e* side is omitted since it is equivalent to the plan view of the multilayer conductor component 1 as viewed from the side surface 2*f* side shown in FIG. 5.

As shown in FIGS. 4 and 5, the edge 21*a* of each sintered metal layer 21 is continuous over the pair of main surfaces 2*c*, 2*d*, the pair of side surfaces 2*e*, 2*f*, and the four ridge portions 2*g* in such a way as to surround the element body 2. The edge 21*a* has an entirely curved shape in such a way that the central portion of each of the pair of main surfaces 2*c* and 2*d* and the pair of side surfaces 2*e* and 2*f* is depressed toward a reference plane. The reference plane is defined as an imaginary plane including the end surface 2*a* on which the external electrode 4 is provided, with respect to the edge 21*a* of the external electrode 4. The reference plane is defined as an imaginary plane including the end surface 2*b* on which the external electrode 5 is provided, with respect to the edge 21*a* of the external electrode 5.

The shape of the edge 21*a* can be controlled, for example, by appropriately adjusting the constituent materials of the conductive paste applied to the surface of the element body 2. The shape of the edge 21*a* can also be controlled, for example, by applying a fluorine hydrophobic treatment to the surface of the element body 2 when applying the conductive paste.

The distance from the edge 21*a* to the reference plane in the first direction D1 is defined as an electrode length L2. The edge 21*a* is continuous over the pair of main surfaces 2*c* and 2*d*, the pair of side surfaces 2*e* and 2*f*, and the four ridge portions 2*g* while varying the electrode length L2. The electrode length L2 is 5% or more and 15% or less of the length L1 of the element body 2 in the first direction D1.

That is, the electrode length L2 varies in a range of 5% or more and 15% or less of the length L1 of the element body 2 in the first direction D1. In this embodiment, the electrodes length $L2_1$ in the four ridge portions 2*g* are equivalent to each other.

As shown in FIG. 4, the electrode length $L2_2$ at the central portion of the main surface 2*d* in the third direction D3 is shorter than the electrode lengths $L2_1$ at the ridge portions 2*g* located on both sides of the main surface 2*d* in the third direction D3. The electrode length L2 monotonically increases from the central portion of the main surface 2*d* in the third direction D3 toward the ridge portions 2*g* located on both sides of the main surface 2*d* in the third direction D3. Here, the term "monotonic increase" means that there is no tendency to decrease and means a broad monotonic increase. In other words, in the main surface 2*d* and the ridge portions 2*g* located on both sides thereof, the electrode length L2 changes with the electrode length $L2_2$ as the minimum value and the electrode lengths $L2_1$ as the maximum value. It can also be said that the edge 21*a* does not have an inflection point between the central portion of the main surface 2*d* in the third direction D3 and the ridge portions 2*g*.

Although not shown, the electrode length at the central portion of the main surface 2*c* in the third direction D3 is shorter than the electrode lengths $L2_1$ at the ridge portions 2*g* located on both sides of the main surface 2*c* in the third direction D3. In this embodiment, the electrode length at the central portion of the main surface 2*c* in the third direction D3 is equal to the electrode length $L2_2$. The electrode length L2 monotonically increases from the central portion of the main surface 2*c* in the third direction D3 toward the ridge portions 2*g* located on both sides of the main surface 2*c* in the third direction D3. In other words, in the main surface 2*c* and the ridge portions 2*g* located on both sides thereof, the electrode length L2 changes with the electrode length $L2_2$ as the minimum value and the electrode lengths $L2_1$ as the maximum value. It can also be said that the edge 21*a* does not have an inflection point between the central portion of the main surface 2*c* in the third direction D3 and the ridge portions 2*g*.

As shown in FIG. 5, the electrode length $L2_3$ at the central portion of the side surface 2*f* in the second direction D2 is shorter than the electrode lengths $L2_1$ at the ridge portions 2*g* located on both sides of the side surface 2*f* in the second direction D2. In this embodiment, the electrode length $L2_3$ is longer than the electrode length $L2_2$. The electrode length L2 monotonically increases from the central portion of the side surface 2*f* in the second direction D2 toward the ridge portions 2*g* located on both sides of the side surface 2*f* in the second direction D2. In other words, in the side surface 2*f* and the ridge portions 2*g* located on both sides thereof, the electrode length L2 changes with the electrode length $L2_3$ as the minimum value and the electrode length $L2_1$ as the maximum value. It can also be said that the edge 21*a* does not have an inflection point from the central portion of the side surface 2*f* in the second direction D2 to the ridge portions 2*g*.

Although not shown, the electrode length at the central portion of the side surface 2*e* in the second direction D2 is shorter than the electrode lengths $L2_1$ at the ridge portions 2*g* located on both sides of the side surface 2*e* in the second direction D2. In this embodiment, the electrode length at the central portion of the side surface 2*e* in the second direction D2 is equal to the electrode length $L2_2$. The electrode length L2 monotonically increases from the central portion of the side surface 2*e* in the second direction D2 toward the ridge portions 2*g* located on both sides of the side surface 2*e* in the second direction D2. 2 2. In other words, in the side surface 2*e* and the ridge portions 2*g* located on both sides thereof, the electrode length L2 changes with the electrode length $L2_3$ as the minimum value and the electrode length $L2_1$ as the maximum value. It can also be said that the edge 21*a* does not have an inflection point from the central portion of the side surface 2*e* in the second direction D2 to the ridge portions 2*g*.

The first plating layer 23 covers the sintered metal layer 21. The first plating layer 23 covers the sintered metal layer 21 with a substantially uniform thickness. The thickness of the first plating layer 23 is, for example, 0.5 μm or more and 6.5 μm or less. The first plating layer 23 is formed on the sintered metal layer 21 by plating method. The first plating layer 23 is, for example, an Ni plating layer and includes Ni.

The second plating layer 25 covers the first plating layer 23. The second plating layer 25 covers the first plating layer 23 with a substantially uniform thickness. The thickness of the second plating layer 25 is, for example, 1.5 μm or more and 8.0 μm or less. The second plating layer 25 is formed on the first plating layer 23 by plating method. The second plating layer 25 is, for example, an Sn plating layer and includes Sn.

The multilayer conductor component 1 may further include a third plating layer (not shown) overlying the second plating layer 25. In this case, for example, the first plating layer 23 may be a Cu plating layer, the second plating layer 25 may be a Ni plating layer, and the third plating layer may be a Sn plating layer.

As described above, in the multilayer conductor component 1, the edge 21*a* of the sintered metal layer 21 is continuous over the pair of side surfaces 2*e* and 2*f*, the pair of main surfaces 2*c* and 2*d*, and the ridge portions 2*g*. When the multilayer conductor component 1 is mounted on an electronic device by soldering, the stress due to thermal shock or the like is likely to be concentrated in a portion of the edge 21*a* where the electrode length L2 is long. In particular, in the main surface 2*d* which is the mounting surface and the pair of side surfaces 2*e* and 2*f* which are adjacent to the mounting surface, the stress tends to concentrate on the edge 21*a* via the solder.

In the multilayer conductor component 1, the electrode length $L2_2$ at the central portion of the main surface 2*d* in the third direction D3 is shorter than the electrode length $L2_1$ at each ridge portion 2*g* located on both sides of the main surface 2*d* in the third direction D3. Therefore, in the multilayer conductor component 1, the stress can be dispersed from the central portion of the main surface 2*d* to the ridge portions 2*g* located on both sides of the main surface

2*d*. The electrode length $L2_3$ at the central portion of each of the pair of side surfaces 2*e* and 2*f* in the second direction D2 is shorter than the electrode length $L2_1$ at each of the ridge portions 2*g* located on both sides of each of the pair of side surfaces 2*e* and 2*f* in the second direction D2. Therefore, the stress can be dispersed from the central portion of each of the pair of side surfaces 2*e* and 2*f* to each of the ridge portions 2*g* located on both sides of each of the pair of side surfaces 2*e* and 2*f*. From the above, the occurrence of cracks in the element body 2 can be suppressed.

The electrode length L2 monotonically increases from the central portion of the main surface 2*d* in the third direction D3 toward each of the ridge portion 2*g* located on both sides of the main surface 2*d* in the third direction D3. If the edge 21*a* has an inflection point between the central portion of the main surface 2*d* in the third direction D3 and the ridge portion 2*g*, and a part of the edge 21*a* protrudes or is depressed in the first direction D1, stress may be concentrated in the part or the vicinity thereof. The multilayer conductor component 1 can suppress such stress concentration. Therefore, the stress can be reliably dispersed from the central portion of the main surface 2*d* to each of the ridge portions 2*g* located on both sides of the main surface 2*d*.

The electrode length L2 monotonically increases from the central portion of each of side surfaces 2*e* and 2*f* in the second direction D2 toward each of the ridge portions 2*g* located on both sides of each of side surfaces 2*e* and 2*f* in the second direction D2. If the edge 21*a* has an inflection point between the central portion of each of the side surfaces 2*e* and 2*f* in the second direction D2 and the ridge portions 2*g*, and a part of the edge 21*a* protrudes or is depressed in the first direction D1, stress may be concentrated in the part or the vicinity thereof. The multilayer conductor component 1 can suppress such stress concentration. Therefore, the stress can be reliably dispersed from the central portion of each of the side surfaces 2*e* and 2*f* to each of the ridge portions 2*g* located on both sides of each of the side surfaces 2*e* and 2*f*.

The sinterabilities of the ridge portions 2*g* are greater than the sinterabilities of the other portions of the element body 2. As a result, the strengths of the ridge portions 2*g* are improved, and the occurrence of cracks in the element body 2 is further suppressed.

The element body 2 includes the sintered ferrite body. The firing temperature of the dielectric ceramic or the like is about 1000° C., while the firing temperature of the ferrite is about 900° C. As described above, since the element body 2 includes the ferrite sintered body having a low firing temperature and having difficulty in improving the strength, it is more important to suppress the occurrence of cracks.

The electrode length L2 is 5% or more and 15% or less of the length L1 of the element body 2 in the first direction D1. When the electrode length L2 is 5% or more, the mounting strength of the multilayer conductor component 1 can be increased. When the electrode length L2 is 15% or less, the main surfaces 2*c* and 2*d* and the side surfaces 2*e* and 2*f* are prevented from being pulled via the solder starting from the central portion side in the first direction D1. Thus, the stress applied to the element body 2 can be suppressed.

The electrode length at the central portion of the main surface 2*c* in the third direction D3 is shorter than the electrode length $L2_1$ at each of the ridge portions 2*g* located on both sides of the main surface 2*c* in the third direction D3. Therefore, the stress can be dispersed from the central portion of the main surface 2*c* to the ridge portions 2*g* located on both sides of the main surface 2*c*. Although the amount of solder provided on the main surface 2*c* is smaller than the amount of solder provided on the main surface 2*d* or the pair of side surfaces 2*e* and 2*f*, stress may be concentrated on the edge 21*a* via the solder on the main surface 2*c*. Therefore, not only in the main surface 2*d* and the pair of side surfaces 2*e* and 2*f* but also in the main surface 2*c*, the occurrence of cracks in the element body 2 is further suppressed by dispersing the stress in the ridge portions 2*g*.

The electrode length L2 monotonically increases from the central portion of the main surface 2*c* in the third direction D3 toward the ridge portions 2*g* located on both sides of the main surface 2*c* in the third direction D3. If the edge 21*a* has an inflection point between the central portion of the main surface 2*c* in the third direction D3 and the ridge portion 2*g*, and a part of the edge 21*a* protrudes or is depressed in the first direction D1, stress may be concentrated in the part or the vicinity thereof. The multilayer conductor component 1 can suppress such stress concentration. Therefore, the stress can be reliably dispersed from the main surface 2*c* to the ridge portions 2*g* located on both sides of the main surface 2*c*.

Each ridge portion 2*g* is rounded in such a way that its surface is curved. If a corner exists in the ridge portion 2*g*, stress may be concentrated in the corner. The rounded ridge portion 2*g* suppresses concentration of stress. As a result, the occurrence of cracks in the element body 2 is further suppressed.

Although the embodiment has been described above, the present invention is not necessarily limited to the embodiment described above, the embodiment can be variously changed without departing from the scope of the invention.

In the multilayer conductor component 1, both the electrode length $L2_2$ and the electrode length $L2_3$ are shorter than the electrode length $L2_1$, but one of the electrode length $L2_2$ and the electrode length $L2_3$ may be shorter than the electrode length $L2_1$ and the other may be equal to or less than the electrode length $L2_1$. For example, even when the electrode length $L2_2$ is shorter than the electrode length $L2_1$ and the electrode length $L2_3$ is equal to or less than the electrode length $L2_1$, it is possible to suppress the concentration of the stress at the central portions of the side surfaces 2*e* and 2*f* while dispersing the stress from the central portion of the main surface 2*d* to the ridge portions 2*g* located on both sides of the main surface 2*d*. Even when the electrode length $L2_2$ is equal to or less than the electrode length $L2_1$, it is possible to suppress the concentration of the stress at the central portion of the main surface 2*d* while dispersing the stress from the central portions of the side surfaces 2*e* and 2*f* to the ridge portions 2*g* located on both sides of the side surfaces 2*e* and 2*f*.

In the multilayer conductor component 1, the electrodes length $L2_1$ at the four ridge portions 2*g* may be different from each other. Even in this case, if the electrode length $L2_2$ is shorter than the electrode length $L2_1$, the stress can be dispersed from the central portion of the main surface 2*d* to the ridge portions 2*g* located on both sides of the main surface 2*d*. If the electrode length $L2_3$ is shorter than the electrode length $L2_1$, the stress can be dispersed from the central portion of each of the side surfaces 2*e* and 2*f* to the ridge portions 2*g* located on both sides of each of the side surfaces 2*e* and 2*f*.

In the multilayer conductor component 1, the external electrodes 4 and 5 have the same shape, but the external electrodes 4 and 5 may have different shapes. For example, in at least one of the external electrodes 4 and 5, the electrode length $L2_2$ may be shorter than the electrode length $L2_1$, and the electrode length $L2_3$ may be the electrode length $L2_1$ or less. For example, in at least one of the external electrodes 4 and 5, the electrode length $L2_2$ may be the electrode length $L2_1$ or less, and the electrode length $L2_3$ may be shorter than the electrode length $L2_1$. In this case, it is possible to suppress the cracks of the element body 2 caused by at least one of the external electrodes 4 and 5.

The multilayer conductor component 1 may have a linear conductor instead of the coil conductors 16*a* to 16*f* as the internal conductor.

What is claimed is:

1. A multilayer inductor component comprising:

an element body having a rectangular parallelepiped shape and including a pair of end surfaces opposed to each other in a first direction; a first main surface constituting a mounting surface; a second main surface opposed to the first main surface in a second direction orthogonal to the first direction; and a pair of side surfaces opposed to each other in a third direction orthogonal to the first direction and the second direction;

an internal conductor disposed in the element body; and an external electrode including a sintered metal layer which is disposed on an end surface of the pair of end surfaces, the pair of side surfaces, the first main surface, and the second main surface and electrically connected to the internal conductor, wherein the element body includes four ridge portions disposed between each of the pair of side surfaces and each of the first main surface and the second main surface, an edge of the sintered metal layer is continuous over the pair of side surfaces, the first main surface, the second main surface, and the ridge portions, an electrode length, which is a length in the first direction from the edge of the sintered metal layer to a reference plane including the end surface, at a central portion of the first main surface in the third direction, is shorter than the electrode length at each of the ridge portions located on both sides of the first main surface in the third direction, and the electrode length at a central portion of each of the pair of side surfaces in the second direction is equal to or less than the electrode length at each of the ridge portions located on both sides of each of the pair of side surfaces in the second direction.

2. The multilayer inductor component according to claim 1, wherein the electrode length monotonically increases from the central portion of the first main surface in the third direction toward the ridge portions located on both sides of the first main surface in the third direction.

3. The multilayer inductor component according to claim 1, wherein the electrode length at the central portion of each of the pair of side surfaces in the second direction is shorter than the electrode length at each of the ridge portions located on both sides of each of the pair of side surfaces in the second direction.

4. A multilayer inductor component comprising:

an element body having a rectangular parallelepiped shape and including a pair of end surfaces opposed to each other in a first direction; a first main surface constituting a mounting surface; a second main surface opposed to the first main surface in a second direction orthogonal to the first direction; and a pair of side surfaces opposed to each other in a third direction orthogonal to the first direction and the second direction;

an internal conductor disposed in the element body; and an external electrode including a sintered metal layer which is disposed on an end surface of the pair of end surfaces, the pair of side surfaces, the first main surface, and the second main surface and electrically connected to the internal conductor, wherein the element body includes four ridge portions disposed between each of the pair of side surfaces and each of the first main surface and the second main surface, an edge of the sintered metal layer is continuous over the pair of side surfaces, the first main surface, the second main surface, and the ridge portions, an electrode length, which is a length in the first direction from the edge of the sintered metal layer to a reference plane including the end surface, at a central portion of the first main surface in the third direction, is equal to or less than the electrode length at each of the ridge portions located on both sides of the first main surface in the third direction, and the electrode length at a central portion of each of the pair of side surfaces in the second direction is shorter than the electrode length at each of the ridge portions located on both sides of each of the pair of side surfaces in the second direction.

5. The multilayer inductor component according to claim 4, wherein the electrode length monotonically increases from the central portion of each of the pair of side surfaces in the second direction toward the ridge portions located on both sides of each of the pair of side surfaces in the second direction.

6. The multilayer inductor component according to claim 1, wherein sinterabilities of the ridge portions are greater than sinterabilities of other portions of the element body.

7. The multilayer inductor component according to claim 1, wherein the element body includes a ferrite sintered body.

8. The multilayer inductor component according to claim 1, wherein the electrode length is 5% or more and 15% or less of a length of the element body in the first direction.

9. The multilayer inductor component according to claim 1, wherein the electrode length at a central portion of the second main surface in the third direction is shorter than the electrode length at each of the ridge portions located on both sides of the second main surface in the third direction.

10. The multilayer inductor component according to claim 9, wherein the electrode length monotonically increases from the central portion of the second main surface in the third direction toward the ridge portions located on both sides of the second main surface in the third direction.

11. The multilayer inductor component according to claim 4, wherein sinterabilities of the ridge portions are greater than sinterabilities of other portions of the element body.

12. The multilayer inductor component according to claim 4, wherein the element body includes a ferrite sintered body.

13. The multilayer inductor component according to claim 4, wherein the electrode length is 5% or more and 15% or less of a length of the element body in the first direction.

14. The multilayer inductor component according to claim 4, wherein the electrode length at a central portion of the second main surface in the third direction is shorter than the electrode length at each of the ridge portions located on both sides of the second main surface in the third direction.

15. The multilayer inductor component according to claim 14, wherein the electrode length monotonically increases from the central portion of the second main surface in the third direction toward the ridge portions located on both sides of the second main surface in the third direction.

16. The multilayer inductor component according to claim 1, wherein the sintered metal layer extends inwardly along the first direction from the reference plane including the end surface to the edge of the sintered metal layer that is disposed continuously over the pair of side surfaces, the first main surface, the second main surface, and the ridge portions.

17. The multilayer inductor component according to claim 4, wherein the sintered metal layer extends inwardly along the first direction from the reference plane including the end surface to the edge of the sintered metal layer that is disposed continuously over the pair of side surfaces, the first main surface, the second main surface, and the ridge portions.

18. The multilayer inductor component according to claim 1, wherein the sintered metal layer terminates on the pair of side surfaces, the first main surface, the second main surface, and the ridge portions at the edge.

19. The multilayer inductor component according to claim 4, wherein the sintered metal layer terminates on the pair of side surfaces, the first main surface, the second main surface, and the ridge portions at the edge.

* * * * *